Sept. 8, 1953   I. JEPSON   2,651,707
AUTOMATIC COFFEE MAKER
Filed Dec. 31, 1947   3 Sheets-Sheet 2

INVENTOR.
Ivar Jepson,
BY
McCanna & Morsbach
Atty's.

INVENTOR.
Ivar Jepson,

Patented Sept. 8, 1953

2,651,707

UNITED STATES PATENT OFFICE 2,651,707

AUTOMATIC COFFEE MAKER

Ivar Jepson, Oak Park, Ill., assignor to Sunbeam Corporation, Chicago, Ill., a corporation of Illinois Application December 31, 1947, Serial No. 794,960

23 Claims. (Cl. 219—44)

The present invention relates to automatic coffee makers and more particularly to coffee makers of the vacuum type wherein water is heated in one vessel, transferred to another and returned to said one vessel during the coffee making process. Specifically, the present invention is an improvement on prior Letters Patent of the United States No. 2,312,555—Jepson granted March 2, 1943, and assigned to the same assignee as the present application.

Beverage brewers and coffee makers of the so-called vacuum type have been extensively used in recent years. In general this type of coffee maker has comprised a lower heating chamber or vessel and an upper coffee infusion chamber or vessel. Conventionally, water is placed in the lower heating chamber while the coffee grounds are placed in the upper chamber. As the water is heated in the lower chamber, water vapor pressure is created above the liquid in this chamber which when the temperature approaches the boiling point of water forces the water from the lower chamber into the upper chamber to infuse the coffee grounds contained therein. When the heat is removed from the lower chamber, it cools so that the water vapor contained therein condenses to create a vacuum thereby causing the coffee to pass from the upper chamber through a suitable filter into the lower chamber where it preferably is maintained at a temperature of the order of 180° F.

During the coffee making operation the water is heated to well over 200° F. After the coffee has been made, however, it is desirable to hold the temperature at around 180° F. so that the coffee is maintained at what is considered to be the most desirable temperature for serving. In some of the early automatic coffee makers it was common practice to provide two heating elements, one for producing the high heat required during the coffee making operation and the other to maintain the coffee at a temperature of the order of 180° F. for serving. Individual control means for each heating element were provided. More recently a single heating element has been employed and two independent control devices were provided to control the heating operation. Such an arrangement is disclosed in prior copending Jepson application, Serial No. 459,761, filed September 26, 1942, and assigned to the same assignee as the present application. One control device in this copending application is adapted to control the coffee maker during the coffee making operation and particularly during the high heat interval. Subsequently a second control device in the form of a thermal responsive element takes over the control of the heating element to maintain the coffee at the desired temperature for serving.

In the above mentioned Jepson application there is disclosed and claimed an arrangement whereby a single heating element and a single thermostatic control device are employed in an automatic coffee maker not only to control the coffee making operation through the coffee making cycle when the temperature substantially exceeds 200° F. at a certain stage in the process but also subsequently to control the coffee maker and maintain the coffee at a suitable temperature for serving. The above mentioned Jepson patent discloses a very satisfactory arrangement including a mechanical device manually set for the high heat condition during the coffee making operation which is automatically controlled at the completion of the coffee making operation whereby the same thermal responsive device subsequently operates to maintain the coffee at the desired temperature for serving. It would be desirable to provide an automatic coffee maker with a two temperature control device using a single thermal responsive device and a heating element which requires no manual setting but which automatically controls the temperature so as to produce the desired high temperature during the coffee making operation and the somewhat lower temperature for subsequently maintaining the coffee at the desired temperature for serving.

Accordingly it is an object of the present invention to provide a new and improved control arrangement for an automatic coffee maker which without the attention of an operator automatically performs the coffee making operation, terminates it at the proper time and thereafter maintains the coffee in a heated condition as long as desired.

It is a further object of the present invention to provide a vacuum type coffee maker having an improved means for producing a high heat in the heating chamber thereof to transfer the water to the infusion chamber, and thereafter to maintain a low heat to cause the liquid to return to the heating chamber and subsequently to keep the coffee liquid thus produced at a desired temperature for serving, employing only a single thermal responsive element for controlling a main heating element.

Still another object of the present invention is to provide a coffee maker of the character described which is simple in construction, economical to manufacture considering the functions performed, and which will serve in a practical and satisfactory manner the purposes intended.

A still further object of the present invention is to provide a coffee maker adapted for automatically making coffee and keeping it at a serving temperature controlled by a single thermal responsive device the latter of which functions to control the temperature of the coffee maker vessel within different temperature ranges to effect heat control operations without any manual control thereof whatsoever.

A further object of the present invention is to provide a new and improved automatic coffee maker.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which.

The present invention is primarily directed to vacuum type coffee makers and others operating on analagous principles, that is, by displacing hot water or liquid from one vessel into another or into another section of the first vessel which liquid is subsequently returned to the first vessel. It should be understood, however, that although the present invention is illustrated in the drawings as specifically applied to an automatic coffee maker of the vacuum type that the invention in its broader aspects may be applicable to other types of coffee makers as well as other cooking devices wherein a cooking operation may be controlled in the manner contemplated by the present invention.

Referring now to the drawings where like parts are designated by the same reference numerals there is illustrated a coffee maker generally designated at 10 comprising a lower water heating chamber or vessel 11 and an upper coffee infusion vessel or chamber 12. These vessels may be formed of any suitable material such as glass, metal or the like. As illustrated in the drawings the vessels are designated as being formed of a suitable metal such as a chromium plated copper or the like. The lower vessel 11, which is commonly designated as the pot since it may be so used following the removal of the upper vessel at the completion of the coffee making operation, has a handle 13 which is fastened thereto at its upper end by a screw 14 extending through the wall of the vessel 11. The lower end of the handle extends beneath an annular shoulder 15 defined at the bottom of the vessel 11. The vessel 11 is further provided with a vertically extending rim 16 defining an opening 17. The rim 16 has fastened thereto a pouring lip and spout 18 whereby the vessel 11 may be used as a pot to serve the coffee. The opening 17 in the vessel 11 may be covered by a suitable closure member to be described hereinafter when used as a coffee pot to serve coffee therefrom. The bottom of the vessel 11 is defined by a member 20 having a peripheral flange 21 adapted to abut against a depending flange 22 formed integrally with the annular shoulder 15. The flanges 21 and 22 are concentrically arranged in intimate engagement and are preferably joined by brazing or the like to provide a fluid tight vessel 11. The member 20 is sloped slightly as shown at 23, toward a central well 24. Fastened to the bottom of the well 24, and disposed substantially at its center is an upstanding stud 25 having a flange 26 bearing against the bottom of the well 24, when suitably clamped thereto by fastening means including the nut 27 described in greater detail hereinafter.

As illustrated the upper infusion vessel or bowl 12 consists of a symmetrical bowl shaped container formed of an upper section 28 and a lower section 29 joined in any suitable manner as indicated at 30. It will be understood that a one part vessel as shown in the above mentioned Jepson patent may be employed if desired. The lower section 29 of the vessel 12 is illustrated as having a well portion 29a of reduced cross section which terminates in a displacement tube 31. The displacement tube 31 communicates with the interior of the bowl 12 and is preferably threaded into a threaded boss 32 fastened to the bottom of the well 29a around an opening 33 defined therein. In this way the tube 31 is readily removable for cleaning purposes. The tube 31 terminates at its lower end within the well 24 of the pot 11 below the level of the main body thereof, and serves to conduct water from the interior of the pot 11 upward into the bowl 12 when displaced by steam pressure within the pot 11. A rubber or similar gasket 34 is positioned around the exterior of the well 29a and is shaped to seat in the open top 17 of the pot 11 as best shown in Fig. 1 of the drawings for the purpose of producing a steam-tight joint between the bowl 12 and the pot 11, the gasket 34 sealingly engaging the pouring spout and lip 18.

Figure 1:
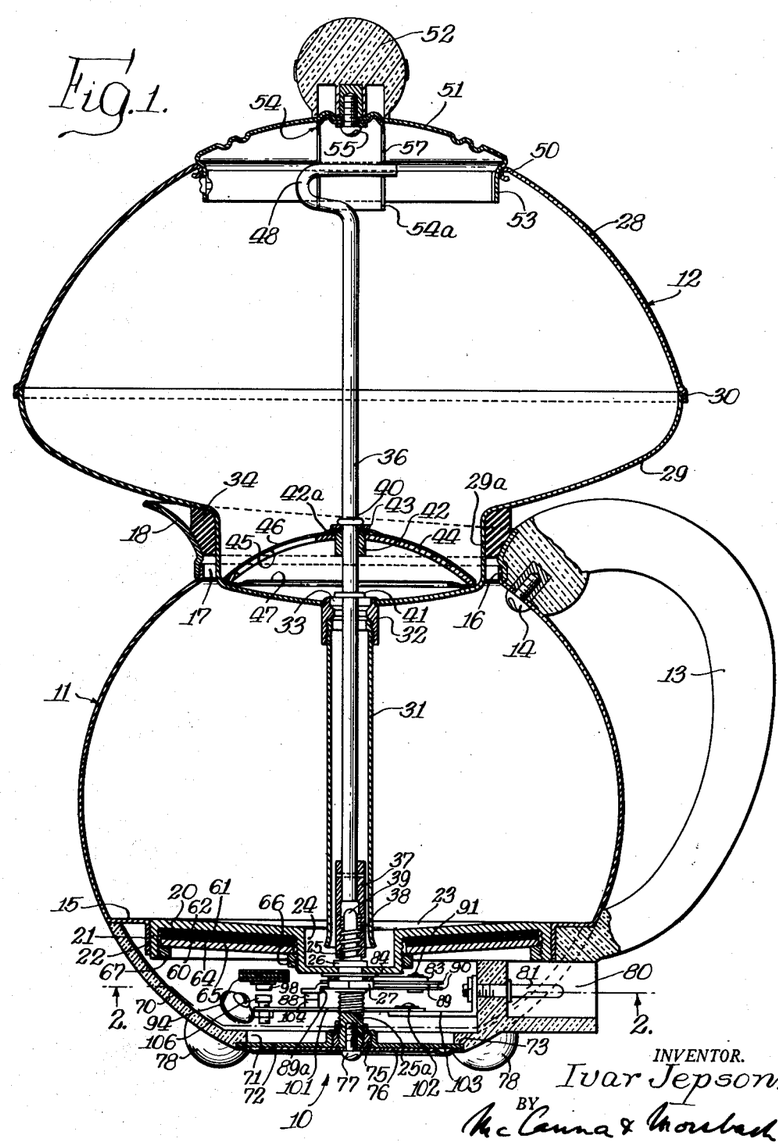
Fig. 1 is a vertical sectional view through an automatic coffee maker embodying the present invention.
Figure 2:
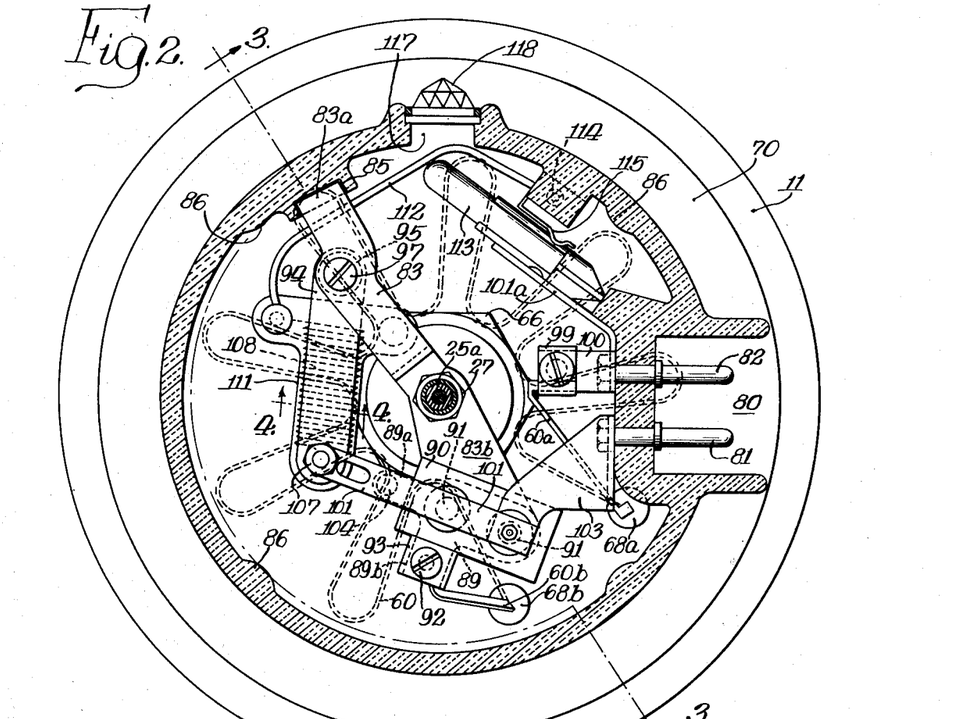
Fig. 2 is an enlarged sectional view taken on line 2—2 of Fig. 1 assuming that Fig. 1 shows a complete structure.

For the purpose of fixedly securing the bowl 12 and the pot 11 together and compressing the gasket 34, there is provided a rod 36 of a length to extend from the upper end of the bowl 12 to a point adjacent the lower end of the pot 11 as shown in Fig. 1 of the drawings. The lower end of the rod 36 has an internally threaded sleeve 37 suitably fastened thereto and adapted to engage threads 38 on stud 25, the upper end of which includes a pilot point 39 for guiding the sleeve 37 into engagement with the threads 38. Intermediate its ends the rod 36 is provided with spaced abutments 40 and 41 between which is slidably positioned on the rod 36, a collar 42 and a washer 43. The collar 42 serves to position a filter frame 44 which comprises a downwardly concave spider having openings 45 therein. The collar 42 is provided with a flange 42a which rests on the frame 44 retaining the filter 44 in position but permitting rotation of the rod 36 with respect to the frame and also rotation of the rod 36 with respect to the collar 42. The frame 44 is covered by a filter cloth 46 of conventional material in the form of a disk, the peripheral edges of which are gathered below the concave frame 44 by means of a drawstring or the like, as shown at 47. The filter cloth 46 has a central opening for the passage of the rod 36 therethrough but of such size that the filter portions defining this opening engage with and rest on the flange 42a of the collar 42. The washer 43 rests on the filter cloth 46 which is adapted to be clamped between the washer 43 and the flange 42a.

To provide a manual manipulating means for the rod 36 the upper end thereof is bent transversely of its length, as shown at 48. From the above description it will be seen that when the infusion vessel 12 is positioned on the pot 11, the rod 36 with the attached filter may be inserted through the top of the vessel 12, the sleeve 37 passing down through the tube 31 into engagement with the upper end of the stud 25. Thereupon rotation of the rod 36 causes the rod to move downwardly so that the abutment 40 engages the washer 43, causing the filter cloth 46 to be clamped between the washer 43 and the flange 42a of the collar 42. The lower periphery of the frame 44 and the filter cloth 46 engage against the bottom of the well 29a. The rod 36 is rotated until the parts are drawn up tightly, thus compressing the gasket 34 and rigidly securing the parts in position. Because of the manner in which the filter 46 and filter frame 44 are removably secured to the rod 36, the cloth is easily removed for cleaning or replacement and the parts are easily disassembled for access to all portions of the device during the cleaning operation.

For the purpose of affording access to the upper bowl or infusion vessel 12, it is provided with an opening coaxial with the well 29a but located at the opposite end of the vessel. This top opening is defined by a rolled edge 50 formed from the section 28 of the vessel 12. A closure member 51 is provided for this opening which closure member includes a knob 52 formed of insulating material and a depending flange 53 adapted to seat in the opening defined by the rolled edge 50. This opening is preferably of substantially the same size as the opening 17 in the lower vessel or pot 11 so that the closure member 51 may be interchangeably used on the bowl 12 or on the vessel 11 particularly when the latter is used as a pot from which coffee is served. A member 54 having depending flanges 54a is axially positioned on the lower side of the closure member 51 by means of a screw 55 or otherwise, the flanges 54a being of such depth as to rest within the plane of the end 48 of the rod 36. The flanges 54a have vertical slots 57 defined therein which are open at the bottom to receive the end 48 of the rod 36 therein, so that upon rotation of the closure member 51 the rod 36 may be rotated by contact with the slots 57 in the flanges 54a. With this arrangement, at the conclusion of the coffee making operation, the operator may disengage the rod 36 from the stud 25 by rotation of the knob 52. Consequently it is unnecessary for the operator to come into contact with heated portions of the device for the purpose of disengaging the rod 36.

In order to heat the liquid contained within the lower vessel 11 during the coffee making operation there is provided a main heating element generally designated at 60 in Figs. 2, 5, 6 and 7 of the drawings. This heating element, preferably in the form of a ribbon resistor element, is wound upon an annular insulating member 61 such as an annular mica support which is adapted to be disposed in the annular space defined between the flange 21 and the outside of the wall defining the well 24. For the purpose of insulating the resistance element 60 from the lower surface of the bottom 20, a thin layer of mica designated at 62 is provided and a similar layer 64 is disposed against the lower surface of the heating element wound on the annular support 61. In order that this heating element 60 may be maintained in its proper position adjacent the bottom 20 of the vessel 11 it is clamped together with the insulating members 61, 62 and 64 between the bottom 20 and an annular clamping plate 65 which latter is held in position by means of a nut 66 engaging with suitable threads defined on the outer surface of the wall defining the well 24. Similarly a clamping ring 67 engages with threads provided on the inner diameter surface of the flange 21 as is clearly shown in Fig. 1 of the drawings whereby the heating element 60 may be firmly held in position against the bottom of the vessel 11 for heating the same while at the same time permitting ready replacement thereof in the event that this should be necessary. One end of the heating element designated as 60a is brought out through a suitable opening in the clamping plate 65 and is insulated therefrom by a ceramic button 68a. The other terminal of the heating element designated as 60b is similarly brought out through an opening in the clamping plate 65 and insulated therefrom by a suitable ceramic insulating button 68b.

Figure 3:
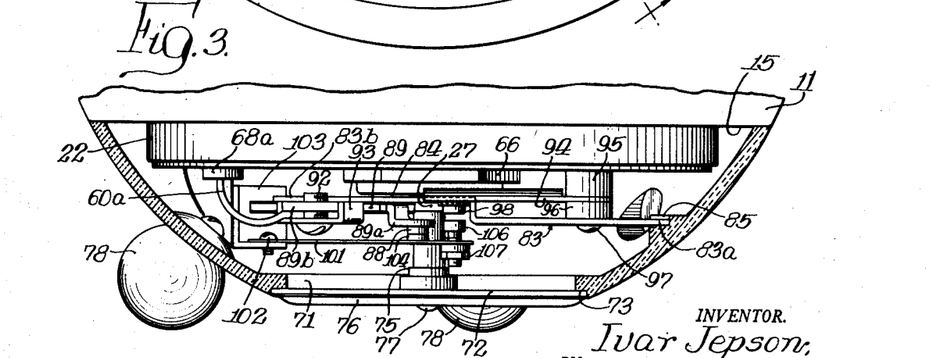
Fig. 3 is a sectional view taken on line 3—3 of Fig. 2 assuming that Fig. 2 shows a complete structure.

For the purpose of housing the control elements for the automatic coffee maker 10 there is provided an auxiliary base 70 preferably formed of suitable insulating material and having a somewhat bowl shaped cross section as is clearly shown in Figs. 1 and 3 of the drawings. This auxiliary base is preferably formed of molded insulating material and is provided with an opening 71 at the bottom thereof adapted to be closed by a center plate 72 which rests on a shoulder 73 defined by an annular recess cut in the auxiliary base 70 surrounding the opening 71. The auxiliary base 70 is preferably provided with suitable abutments around the upper end thereof for engaging with the shoulder 15 and the flange 22, properly to position the same relative to the vessel 11, and the exterior configuration is such as to provide a somewhat streamlined appearance whereby a continuous surface is presented at the junction between the vessel 11 and the auxiliary base 70. The stud 25, which extends through the bottom of the well 24 and is clamped thereto by the nut 27, has a threaded extension 25a which is adapted to extend through an opening in the center plate 72. A suitable clamping nut 75 is provided for holding the center plate 72 in position against the annular shoulder 73 and at the same time secures the auxiliary base 70 to the bottom of the vessel 11. If desired the center plate 72 may be covered by a decorative plate 76 held in place by a screw 77 engaging with a threaded opening defined in the end of the extension 25a of the stud 25.

As illustrated the auxiliary base 70 is provided with suitable legs 78 specifically illustrated as spherical members which are fastened by suitable fastening means at spaced points around the auxiliary base 70. These legs 78 permit ventilation below the coffee maker 10 and in addition improve the appearance of the structure. Integrally formed with the auxiliary base 70 is a recess 80 wherein are disposed contact pins 81 and 82 which may be suitably connected to a conventional appliance cord, the contact pins 81 and 82 providing bayonet type contacts. The recess 80 is designed to receive the conventional contact plug which is preferably connected by means of the conventional appliance cord, not shown, to any suitable electrical outlet. As illustrated the contact pins 81 and 82 are suitably fastened within openings defined in one of the walls of the recess 80 and extend therethrough to make electrical connections with the control arrangement to be described in detail hereinafter disposed within the auxiliary base 70.

Figures 5, 6:
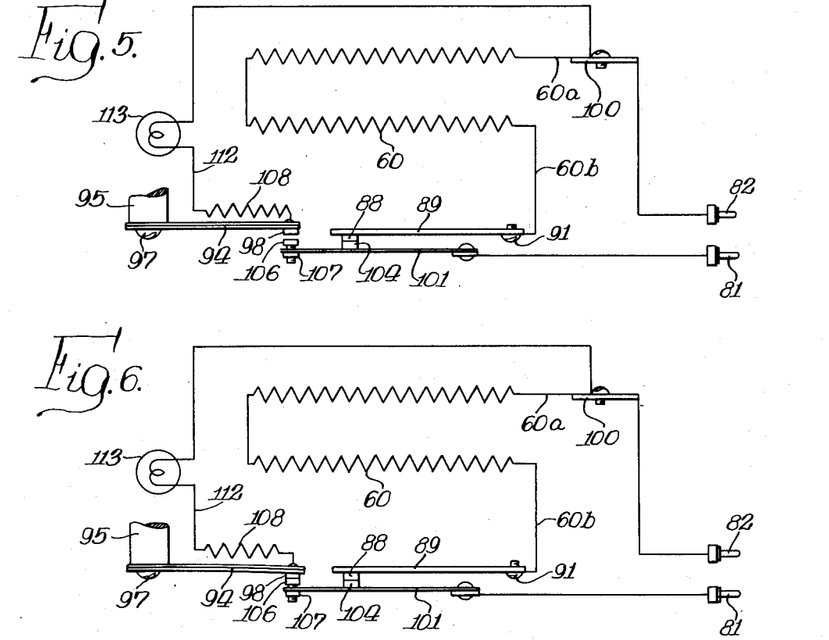
Fig. 5 is a schematic circuit diagram showing the control mechanism of the present invention at the instant that power is connected to the terminals thereof or when no power is connected to the coffee maker.
Fig. 6 is a schematic diagram similar to Fig. 5 showing a subsequent position of the control elements during a coffee making operation at the completion of the high temperature control thereof or at the start of the brewing operation.
Figure 7:
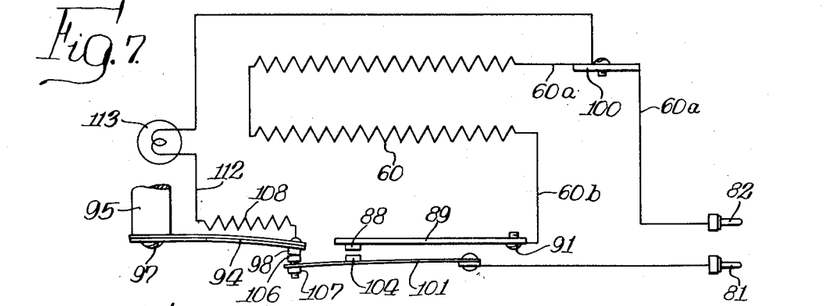
Fig. 7 is the same schematic diagram shown in Figs. 5 and 6 with circuit to the main heating element shown in the open position.

To support some of the control apparatus disposed within the housing defined by the auxiliary base 70 and the bottom of the vessel 11 there is provided a bracket 83 having an opening through which the extension 25a of the stud 25 is adapted to extend. This bracket is firmly clamped to the bottom of the well 24 by means of the nut 27, a suitable washer 84 being illustrated as disposed between the bracket 83 and the bottom of the well 24. One end of the bracket 83 specifically designated as 83a extends into a recess 85 molded in the auxiliary base 70 thereby firmly supporting the end 83a. The end of the bracket 83 is illustrated as being curved at an angle best shown in Fig. 2 of the drawings in order not to interfere with the fastening means for the adjacent leg 78, the inner wall of the auxiliary base 70 being slightly thickened as designated at 86 around the periphery thereof where the legs or feet 78 are fastened thereto. One end, namely the end 83b of the bracket 83 is arranged to support a suitable stationary contact 88. This stationary contact 88 is illustrated as being electrically connected to a suitable conducting plate 89 insulated from the bracket 83 by two plates of insulating material 90, one disposed on either side of the plate 89. The insulating plates 90 which may be formed of mica or the like and the conducting plate 89 are clamped to the end 83b of the bracket 83 as a unitary assembly by suitable rivets 91. The plate 89 is provided with two lateral extensions 89a and 89b. The lateral extension 89a supports the stationary contact 88, while the lateral extension 89b provides a terminal whereby the end 60b of the heating element 60 may be electrically connected thereto by means of a clamping member 93 and a screw 92 threaded into the lateral extension 89b. The corresponding parts of Figs. 5, 6 and 7 showing the schematic circuit diagram are designated by the same reference numerals as in the structural figures thereby to aid in understanding the present invention.

In accordance with the present invention a suitable thermal responsive device in the form of a bi-metallic element generally designated at 94 is provided which has one end thereof supported at least partially by the bracket 83. As illustrated the bi-metallic element 94 is in the form of a flat member one end of which is clamped to a stud 95, preferably formed of good heat conducting material such as copper or the like, which stud preferably is brazed or otherwise suitably connected in good heat conducting relationship with the bottom 20 of the vessel 11 and which extends through suitable openings defined in the insulating members 61, 62 and 64 and clamping plate 65 thereby providing a good conductor of heat from the bottom of the vessel 11 to the bimetallic element 94. As illustrated a suitable spacer 96 is interposed between the bi-metallic element 94 and the bracket 83 and a clamping screw 97 extends through the bracket 83 and the spacer 96 into threaded engagement with a threaded opening defined in the stud 95. The free end of the bi-metallic element 94 is provided with a contact 98 the purpose of which will be described in detail hereinafter.

The end 60a of the heating element 60 is electrically connected to a conductor 100 of angle shape by means of a clamp 99 and associated screw threadedly engaging the conductor 100. The angle shaped conductor 100 is suitably bolted to the end of the contact pin 82 extending through the wall of the recess 80 thereby electrically connecting one end of the heating element 60 to the pin 82 and furthermore mechanically supporting the conductor 100.

For the purpose of completing the electrical circuit between the contact pins 81 and 82 through the heating element 60 there is provided a conducting arm 101 which has one end thereof fastened by means of a screw or other fastening means 102 to a bracket 103 suitably fastened to the contact pin 81. The contact arm 101 supports a first contact 104 disposed so as to be coaxial with the contact 88 supported by one end of the bracket 83. The contact 88 is rigidly supported, whereas the contact 104 is somewhat resiliently supported since the contact arm 101 is preferably formed of a suitable resilient conducting material such as Phosphor bronze or the like. Preferably the arrangement is so designed that under normal conditions the contact 104 is firmly biased by the inherent resilience of the contact arm 101 into contacting engagement with the contact 88. As a result a circuit which includes the heating element 60 is normally completed between the contact pins 81 and 82. The contacts 88 and 104 define the main switch for controlling the heating element 60.

The stationary contact 88 and the contact 98 supported at the free end of the bimetallic element 94 are disposed along a line colinear with the contact arm 101. Consequently a second contact 106 disposed at the end of the contact arm 101 may also be coaxial with the contact 98. As illustrated the contact 106 is an adjustable contact having a threaded end adapted to be threadedly engaged with the free end of the contact arm 101. A suitable lock nut 107 may be provided to hold the contact 106 in any desired adjusted position. Under normal conditions when the bimetallic element 94 is at room temperature or below the contacts 98 and 106 are out of engagement and assume the positions shown in Figs. 1, 3 and 5 of the drawings. Since the end of the bimetallic element 94 is connected in heat conducting relationship with the heat conducting stud 95 it will be responsive to the temperature of the bottom 20 of the vessel 11 and consequently responsive to the temperature of the liquid contained therein. As the thermal responsive device 94 is subjected to heating due to energization of the heating element 60, the free end thereof deflects or warps so that the contact 98 tends to move toward the contact 106. Sufficient heating of the bottom 20 causes contacts 98 and 106 to engage in the manner shown in Fig. 6 of the drawings.

Figure 4:
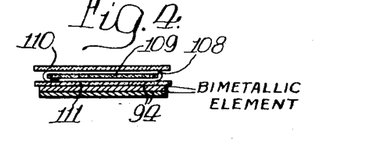
Fig. 4 is an enlarged sectional view of a portion of the automatic coffee maker taken on line 4—4 of Fig. 2.

In accordance with the present invention there is provided a small auxiliary heating element 108 which is disposed closely adjacent to the bimetallic element 94. As illustrated the auxiliary heating element 108 is wound upon a suitable insulating support 109 (see Fig. 4 of the drawings). The insulating support 109 and the auxiliary heating element 108 are disposed between two insulating plates 110 and 111, preferably formed of mica or the like which are disposed immediately adjacent to the bi-metallic or thermal responsive element 94. As illustrated the auxiliary heater assembly including the insulating members 109, 110 and 111 are supported on top of the bimetallic element 94 whereby the heating element 108 is disposed in good heat transfer relationship with the thermal responsive device 94.

Actually one end of the auxiliary heating element 108 is illustrated as being electrically connected to the contact 98 supported at one end of the bimetallic element 94 and consequently the auxiliary heater unit or assembly including the insulating means associated therewith may be mechanically fastened to the bimetallic element 93 by the same means employed for electrically connecting one end of the auxiliary heating element 108 to the contact 98. The other end of the heating element 108 is connected by means of a circuit including a suitable conductor 112 to the contact pin 82.

It is often desirable to provide suitable indicating means for indicating a particular stage in the coffee making operation and to this end there is included in the circuit comprising the conductor 112 an indicating lamp 113 which may be any suitable type of lamp but which has been specifically illustrated as a so-called telephone switch board lamp. The conductor 112 is illustrated as being connected to a suitable terminal 114 which in turn is connected to a spring arm 115. An angular extension 101a of the conductor 100 is disposed in spaced parallel relationship with the spring arm 115. The lamp 113 has its terminals disposed in the space between the extension 101a and the spring arm 115 which serves the dual function of completing the electric connection to the lamp filament as well as mechanically clamping the lamp 113 in position. A suitable opening 117 is defined in the auxiliary base 70 adjacent the lamp 113 which preferably is closed by a colored glass lens 118 so as to give a suitable distinctive indication that a particular stage in the coffee making operation has been reached.

From the foregoing it will be observed that there has been provided a main electric heating element 60 which is controlled by a single switch having the contacts 88 and 104 which are normally biased to the closed position due to the inherent resilience of the spring arm 101. The heating element 60 is preferably designed for about 1000 watts and because of its arrangement of covering substantially the entire bottom of the vessel or pot 11 and its good heat conducting relationship thereto it serves to provide quick heat exchange to the pot 11 to heat the water contained therein to the desired temperature in a comparatively short time. This quick heat exchange is an important factor in obtaining the desired temperature and time control functions hereinafter described. The time and temperature functions depend on the closing and opening of the contacts 88 and 104 and these operations are controlled by the single thermal responsive device in the form of the bimetallic element 94, which is located adjacent the bottom of the pot 11 and in good heat conducting relationship thereto by virtue of the heat conducting stud 95.

It may be observed that no manual control whatever is required of the thermal responsive mechanism disposed within the auxiliary base 70 and fully automatic control is obtained merely by connecting the contact pins 81 and 82 to a source of electric energy such as a house wiring circuit. The only device which can control the contacts 88 and 104 in series with the main heating element 60 is the thermal responsive device 94 and it must be heated a predetermined amount before it has any effect on the normally closed contacts 88 and 104. The cool condition of the thermostat 94 is clearly shown in Fig. 5 of the drawings which indicates that the main heating element 60 is adapted to be energized merely by supplying power to the contact pins 81 and 82 since the switch comprising the contacts 88 and 104 is closed. As the temperature of the pot 11 increases and consequently as the temperature of the liquid contained therein increases the bimetallic element 94 begins to warp or deflect so that the free end thereof bearing the contact 98 moves toward the spring arm 101. As the temperature of the pot approaches some value over 200° F., which may be controlled by suitable adjustment of the contact 106, the contact 98 engages the contact 106 thereby to complete the circuit through the auxiliary heating element 108 in parallel with the main heating element 60. The indicating lamp 113 is also energized at this time to indicate that the temperature of the pot has reached the so-called brewing temperature and that the coffee making operation is in the so-called brewing stage. The additional heat supplied by the auxiliary heater 108 which is disposed closely adjacent to the thermal responsive device 94 causes deflection thereof from the position shown in Fig. 6 of the drawings to the position shown in Fig. 7 of the drawings with the result that the switch for controlling the energy supplied to the main heating element 60 at the contacts 88 and 104 is opened to discontinue the heating operation. It should be understood that the inherent resilience of the contact arm 101 is such as to require a substantial further deflection from that shown in Fig. 6 of the drawings to cause separation of the contacts 88 and 104.

By properly choosing the resistance value of the auxiliary heating element 108 and consequently the wattage input thereto it is possible to get three distinct operating characteristics of the control arrangement of the present invention. The resistance of the auxiliary heating element 108 may be designed to dissipate sufficient wattage to insure continuous deflection of the thermal responsive device 94 to the position shown in Fig. 7 of the drawings, once the contacts have opened, either until the coffee maker is disconnected from the power source or until the hot liquid contained therein is emptied and it is refilled with a cold liquid. It is assumed under these conditions that the wattage supplied to the auxiliary heating element 108 is not sufficient to produce by itself substantial heating of the pot 11 so that the liquid contained therein will gradually cool.

A second operating characteristic is obtained by designing the auxiliary heater 108 to supply a still higher wattage than that described in the first arrangement so that sufficient heat is supplied therefrom back through the stud 95 to maintain the liquid within the pot 11 at a desirable temperature for serving of the order of 180° F. or the like.

A third operating characteristic which is at present considered the preferred one, comprises designing the auxiliary heating element 108 to require a lower wattage than in either of the previously described arrangements, whereby the resistor 108 is not capable of supplying enough heat to the bimetallic element 94 to deflect it permanently to the position shown in Fig. 7 of the drawings. Resistor 108, however, is designed to supply only sufficient heat to the bimetallic element 94 effectively to provide a lower temperature range of operation for the pot 11 than when the auxiliary heating element 108 is not energized. The first range of operation controls the brewing temperature of the automatic coffee maker which is permitted to exceed 200° F. prior to opening the contacts 88 and 104. At the completion of the brewing operation the resistor 108 is connected into the circuit together with the indicating lamp 113 by virtue of the contacts 98 and 106. At this time the heat supplied by the auxiliary heating device 108 is such that substantially less heat need be supplied through the stud 95 to cause the same deflection of the thermostat 94 than was the case when the auxiliary heating device was ineffective. Effectively, therefore, the vessel 11 is controlled within a new range of temperature substantially below 200° such as temperatures of the order of 180°. In this way the coffee liquid contained within the pot 11 may be kept at a suitable temperature for serving due to recurrent opening and closing of the contacts 88 and 104 as the bimetallic element 94 cycles between the position shown in Fig. 6 and the position shown in Fig. 7 of the drawings.

It should be understood that the present invention contemplates all three of the operating characteristics of the auxiliary resistor 108 even though the preferred arrangement at the present time is believed to be the one in which the low temperature control is obtained by recurrent opening and closing of the switch comprising the contacts 88 and 104.

In view of the detailed description included above the operation of the automatic coffee maker of the present invention will be understood by those skilled in the art. Initially the control circuit is as shown in Fig. 5 of the drawings with the main switch comprising the contacts 88 and 104 closed and the auxiliary switch comprising the contacts 98 and 106 in the open position. It is assumed that adjustable contact 106 is suitably adjusted to control the maximum temperature attained during the brewing operation and the resistor 108 is designed in accordance with one of the three operating characteristics described above. The operator first places the requisite amount of water in the pot 11, then assembles the upper vessel 12 together with the filter frame 44, the filter cloth 45, and the rod 36 in the manner shown in Fig. 1 of the drawings. The indicated amount of ground coffee is then placed in the infusion vessel or bowl 12 and the closure member 51 is moved to the position shown in Fig. 1 of the drawings. A suitable appliance power cord is employed to connect the contact pins 81 and 82 to a source of current in a manner well understood by those skilled in the art whereby the automatic coffee maker 10 without more will completely carry out the coffee making operation. No switches of any kind need be manually actuated.

A current thereupon flows through the heating element 60 and the main switch comprising the contacts 88 and 104 with the result that the water in the pot 11 is heated. A water vapor pressure and steam is generated above the liquid within the pot 11 which causes the water to be displaced from the pot 11 to the bowl or infusion vessel 12 through the displacement tube 31 except for a small layer of water disposed within the bottom of the well 24. Preferably the tube 31 is provided with a small opening near the upper end thereof to permit the escape of air and some water vapor pressure until a predetermined pressure is attained within the vessel 11, thereby insuring that cold water is not forced into the infusion chamber 12. When the water is thus displaced from the pot 11 the bottom 20 of the pot heats very rapidly to relatively high temperatures well over 200° F. which high temperatures are transmitted to the thermal responsive device 94 through the conducting stud 95 thereby causing the thermal responsive device 94 to warp downwardly in a comparatively quick action so that contact 98 engages with contact 106 thereby completing the circuit for the auxiliary heater 108 and energizing the indicating lamp 113 to indicate that the brewing stage is in progress. Due to the very rapid temperature rise of the bottom 20 following the displacement of the water the bimetallic element 94 continues to deflect so as to move from the position shown in Fig. 6 of the drawings to the position shown in Fig. 7 with the resultant opening of the main switch comprising the contacts 88 and 104 thereby permitting the pot 11 to cool to a temperature at least as low as about 180° F. During this time the resistor 108 supplies sufficient heat to maintain the bimetallic element 94 in the position shown in Fig. 7 of the drawings. Consequently the steam contained within the pot 11 at least in part condenses creating a reduced pressure within the pot 11 from which this type of coffee maker obtains its name, i. e. vacuum type coffee maker. This low pressure or vacuum condition as it may be termed within the pot 11 draws the liquid within the infusion vessel 12 back into the pot or vessel 11, the liquid passing through the filter cloth 46 as it returns. The various parts of the control device shown in Figs. 5, 6 and 7 of the drawings and particularly the adjustable contact 106 are so adjusted that the liquid is all returned to the pot 11 before the heating element 60 is again energized. In the preferred method of operating the auxiliary heating element mentioned above the bimetallic element 94 will deflect to permit closing of the circuit to the main heating element 60 as shown in Fig. 6 of the drawings, as the temperature of the pot 11 falls below about 180° F. which is considered a desirable temperature for serving coffee. Under this arrangement the auxiliary heater 108 supplies just sufficient heat to cause the bimetallic element 94 to make and break the circuit at the contacts 88 and 104 recurrently to maintain the temperature of the coffee in the pot at approximately 180° F. The operation of the arrangements where a higher wattage is supplied by the auxiliary heating element 108 either to maintain the contacts 88 and 104 open at all times once they have opened and also to supply the heat lost from the pot below a desirable serving temperature will be understood by those skilled in the art.

It will be observed with reference to the foregoing operation that brewing of the coffee takes place when the hot water is in the upper infusion vessel 12. The parts are so proportioned that the temperature of the brewing liquid never reaches the boiling point. Because of the mass of the liquid as well as the mass of the coffee maker a substantial period of time elapses where the liquid remains in the infusion vessel 12. Since the heating element 60 is disconnected at a predetermined temperature regardless of the quantity of liquid employed the opening of the contacts 88 and 104 is in effect the controlled start of the brewing period. As the structure including the liquid cools condensation takes place in the lower vessel and this function is proportional to several factors including the amount of brewing liquid and the related temperature conditions. Since the condensation function creates a vacuum condition in the lower vessel the liquid will be drawn back into the pot 11 in a comparatively short period of time when a sufficiently low pressure is reached thereby terminating the brewing period.

After the liquid has returned to the pot 11 the operator may remove the bowl 12 and mechanism as heretofore described, shifting the closure member 51 from the upper vessel 12 to the pot 11. It will be seen that this may be done at any time after the completion of the coffee making operation although it need not be done immediately thereafter. In other words the operator may prepare the coffee maker, connect the electrical circuit and then proceed with other activities. If a sufficient time has elapsed the coffee making operation will be complete, and the indicating lamp 113 will indicate when the brewing operation starts. Consequently the operator need not be constantly on the alert to determine when the water has been displaced and he may allow substantially an unlimited time to elapse without in any way affecting the coffee making operation. The brewed coffee is maintained at a uniform serving temperature at the completion thereof in a simple manner.

From the above description it will be apparent that there has been provided a simple arrangement in which no manual control switch or the like need be actuated and the automatic coffee making operation is initiated merely by connecting the automatic coffee maker to an electrical outlet. From then on the coffee maker functions to make a delicious coffee which is maintained at a desired temperature for serving without any additional control operation.

Although there has been described what are at present considered to be the preferred embodiments of the invention it should be understood that many changes and modifications will suggest themselves to those skilled in the art. It is intended in the appended claims to cover all those changes and modifications which fall within the true spirit and scope of the present invention.

What is claimed as new and desired to be secured by Letters Patent of the United States is:

1. In an automatic coffee maker, a water heating vessel, a first electric circuit including a main heating element for heating said vessel, a second electric circuit including an auxiliary heating element, a switch including a pair of break contacts serially connected with said main heating element in said first electric circuit and a pair of make contacts serially connected with said auxiliary heating element in said second circuit, and a thermal responsive device for actuating said switch to close said make contacts in response to a predetermined vessel temperature and open said break contacts, said auxiliary heating element being in direct heat transfer relationship with said thermal responsive device.

2. A coffee maker comprising a liquid heating vessel, a main heating element associated with said vessel for heating said vessel and the liquid contained therein during a coffee making operation, a main switch for controlling the flow of current through said heating element comprising a pair of normally closed contacts, a bimetallic element responsive to the temperature of said vessel and adapted upon sufficient heating thereof to cause separation of said contacts, an auxiliary heating element disposed in heat transfer relationship with said bimetallic element, an auxiliary switch comprising a pair of normally open contacts for controlling said auxiliary heating element, means responsive to a predetermined deflection of said bimetallic element in response to heating of said vessel for closing said auxiliary switch, and means responsive to a predetermined greater deflection of said bimetallic element for opening said main switch.

3. A coffee maker comprising a liquid heating vessel, a main heating element associated with said vessel for heating said vessel and the liquid contained therein during a coffee making operation, a main switch for controlling the flow of current through said heating element comprising a pair of normally closed contacts, a bimetallic element responsive to the temperature of said vessel and adapted upon sufficient heating thereof to cause separation of said contacts, an auxiliary heating element disposed in heat transfer relationship with said bimetallic element, an auxiliary switch comprising a pair of normally open contacts for connecting said auxiliary heating element in parallel with said main heating element, means responsive to a predetermined deflection of said bimetallic element in response to heating of said vessel for closing said auxiliary switch, and means responsive to a predetermined greater deflection of said bimetallic element for opening said main switch.

4. A coffee maker comprising a liquid heating vessel, a main heating element associated with said vessel for heating said vessel and the liquid contained therein during a coffee making operation, a main switch for controlling the flow of current through said heating element comprising a pair of normally closed contacts, a bimetallic element responsive to the temperature of said vessel and adapted upon sufficient heating thereof to cause separation of said contacts, an auxiliary heating element disposed in heat transfer relationship with said bimetallic element, an auxiliary switch comprising a pair of normally open contacts for controlling said auxiliary heating element, means responsive to a predetermined deflection of said bimetallic element in response to heating of said vessel for closing said auxiliary switch, and means responsive to a slightly greater deflection of said bimetallic element for opening said main switch, said auxiliary heating element being so designed as to supply sufficient heat to said bimetallic element to maintain said main switch open once it has opened at least until the temperature of said vessel drops to a predetermined value.

5. In an automatic coffee maker, a water heating vessel, a main heating element for heating said vessel, a switch for controlling the flow of current through said main heating element, a thermal responsive device responsive to the temperature of said vessel for controlling said switch, an auxiliary heating element in heat transfer relationship to said thermal responsive device, an auxiliary switch for controlling the energization of said auxiliary heating element, means responsive to the attainment of a predetermined high temperature by said vessel for causing said thermal responsive device to close said auxiliary switch to cause heating of said thermal responsive device directed by said auxiliary heating element, and means for opening said main switch upon an increase in temperature of said thermal responsive device following closing of said auxiliary switch, said auxiliary heating element being capable of supplying sufficient heat to said thermal responsive device to maintain said main switch open once it has opened.

6. In a cooking device comprising a heating vessel, a main heating element associated with said vessel for heating said vessel during a cooking operation, a main switch for controlling the flow of current through said heating element comprising a first contact and a movable resilient arm supporting a movable second contact cooperating with said first contact, said resilient arm inherently tending to bias said movable second contact into engagement with said first contact, a bimetallic element disposed adjacent said vessel and responsive to the temperature of said vessel, an auxiliary heating element disposed adjacent said bimetallic element, an auxiliary switch comprising a pair of contacts for controlling said auxiliary heating element, one of the contacts of said auxiliary switch being supported by said resilient arm, means responsive to a predetermined deflection of said bimetallic element in response to heating of said vessel for causing said contact of said auxiliary switch supported by said resilient arm to engage its associated contact to energize said auxiliary heating element, and means responsive to a continued slightly greater deflection of said bimetallic element for effectively transferring a force through said contacts of said auxiliary switch to open said main switch.

7. A coffee maker comprising a liquid heating vessel, a main heating element associated with said vessel for heating said vessel and the liquid contained therein during a coffee making operation, a main switch for controlling the flow of current through said heating element comprising a first contact and a movable resilient arm supporting a movable contact cooperating with said first contact, said resilient arm inherently tending to bias said movable contact into engagement with said first contact, a bimetallic element disposed adjacent said vessel and responsive to the temperature of said vessel, an auxiliary heating element disposed adjacent said bimetallic element, an auxiliary switch comprising a pair of contacts for controlling said auxiliary heating element, one of the contacts for said auxiliary switch being supported by said resilient arm, means responsive to a predetermined deflection of said bimetallic element in response to heating of said vessel for causing said contact of said auxiliary switch supported by said resilient arm to engage its associated contact to energize said auxiliary heating element, and means responsive to a continued slightly greater deflection of said bimetallic element for effectively transferring a force through said contacts of said auxiliary switch to open said main switch, said auxiliary heating element being so designed as to supply sufficient heat to said bimetallic element to maintain said main switch open once it has opened at least until the temperature of said vessel drops to a predetermined value.

8. A coffee maker comprising a liquid heating vessel, a main heating element associated with said vessel for heating said vessel and the liquid contained therein during a coffee making operation, a main switch for controlling the flow of current through said heating element comprising a first contact and a movable resilient arm supporting a movable contact cooperating with said first contact, said resilient arm inherently tending to bias said movable contact into engagement with said first contact, a bimetallic element disposed adjacent said vessel and responsive to the temperature of said vessel, an auxiliary heating element disposed in heat transfer relationship with said bimetallic element, an auxiliary switch comprising a pair of contacts for controlling said auxiliary heating element, one of the contacts of said auxiliary switch being supported by said resilient arm, means responsive to a predetermined deflection of said bimetallic element in response to heating of said vessel for causing said contact of said auxiliary switch supported by said resilient arm to engage its associated contact to energize said auxiliary heating element, and means responsive to a continued slightly greater deflection of said bimetallic element for effectively transferring a force through said contacts of said auxiliary switch to open said main switch, said auxiliary heating element being so designed as to supply sufficient heat to said bimetallic element to cause said bimetallic element to operate to open said main switch at a different and lower temperature of said vessel than when said auxiliary heating element is de-energized, whereby said vessel and the liquid therein is maintained at a substantially uniform serving temperature by recurrent opening and closing of said main switch.

9. In an automatic coffee maker, a water heating vessel, a first electric circuit including a main heating element for heating said vessel, a second electric circuit including an auxiliary heating element, a switch contact spring assembly including a pair of break contacts serially connected with said main heating element in said first electric circuit and a pair of make contacts serially connected with said auxiliary heating element in said second circuit, and a thermal responsive device for actuating said spring assembly to close said make contacts in response to a predetermined vessel temperature and then open said break contacts.

10. A coffee maker comprising a liquid heating vessel, a main heating element associated with said vessel for heating said vessel and the liquid contained therein during a coffee making operation, a main switch for controlling the flow of current through said heating element comprising a pair of normally closed contacts, a bimetallic element responsive to the temperature of said vessel and adapted upon sufficient heating thereof to cause separation of said contacts, an auxiliary heating element disposed in heat transfer relationship with said bimetallic element, an indicating means serially connected with said auxiliary heating element, an auxiliary switch comprising a pair of normally open contacts for controlling said auxiliary heating element and said indicating means, means responsive to a predetermined deflection of said bimetallic element in response to heating of said vessel for closing said auxiliary switch to energize said auxiliary heating element and said indicating means, and means responsive to a slightly greater deflection of said bimetallic element for opening said main switch.

11. A coffee maker comprising a liquid heating vessel, a first electric circuit comprising a main heating element associated with said vessel for heating said vessel and the liquid contained therein during a coffee making operation, a main switch for controlling the flow of current through said heating element comprising a pair of normally closed contacts, a bimetallic element responsive to the temperature of said vessel and adapted upon sufficient heating thereof to cause separation of said contacts, a second electric circuit comprising an auxiliary heating element disposed in heat transfer relationship with said bimetallic element, an auxiliary switch comprising a pair of normally open contacts for controlling said auxiliary heating element by connecting said second electric circuit in parallel with said first electric circuit, means responsive to a predetermined deflection of said bimetallic element in response to heating of said vessel for closing said auxiliary switch, and means responsive to a slightly greater deflection of said bimetallic element for opening said main switch.

12. In a coffee maker, a pot, an electric heater for heating said pot to a relatively high temperature to perform the coffee making operation and to subsequently maintain the coffee in said pot at a lower temperature for serving, a single thermostat arranged to follow the temperature of said pot, control means responsive to deflection of said thermostat at plural temperature ranges, in the first range to shut off said heater when said pot reaches a predetermined high temperature during the brewing portion of the coffee making operation and in the second range to recurrently turn on and off the heater to maintain the coffee at a substantially uniform serving temperature lower than said brewing temperature, said control means comprising an auxiliary heater for causing said thermostat to operate in said second range when said auxiliary heater is energized.

13. In an automatic coffee maker, a water heating vessel, a first electric circuit including a main heating element for heating said vessel, a second electric circuit including an auxiliary heating element, a switch contact spring assembly including a pair of break contacts serially connected with said main heating element in said first electric circuit and a pair of make contacts serially connected with said auxiliary heating element in said second circuit, and a thermal responsive device for actuating said spring assembly to close said make contacts in response to a predetermined vessel temperature and then open said break contacts, said auxiliary heating element being disposed in good heat transfer relationship with said thermal responsive device to aid in heating said thermal responsive device following closure of said make contacts.

14. In an automatic coffee maker, a water heating vessel, a first circuit including a main heating element for heating said vessel, a switch for controlling the flow of current through said first circuit, a thermal responsive device responsive to the temperature of said vessel for controlling said switch, a second circuit including an auxiliary heating element in heat transfer relationship to said thermal responsive device, and means responsive to the attainment of a predetermined high temperature by said vessel for causing said thermal responsive device to connect said second circuit in parallel with said first circuit, said auxiliary heating element remaining energized during a coffee making cycle once said thermal responsive device has caused said first and second circuits to be connected in parallel regardless of the open or closed condition of the switch.

15. In a coffee maker, an electric heater for heating a pot to a relatively high temperature to perform the coffee making operation and to subsequently maintain the coffee in said pot at a lower temperature for serving, a single thermostat arranged to follow the temperature of said pot, control means responsive to deflection of said thermostat at plural temperature ranges, in the first range to shut off said heater when said pot reaches a predetermined high temperature during the brewing portion of the coffee making operation and in the second range to maintain the coffee at a substantially uniform serving temperature lower than said brewing temperature, said control means comprising an auxiliary heater for causing said thermostat to operate in said second range when said auxiliary heater is energized, said auxiliary heater remaining energized during the remainder of the coffee making cycle once it is energized whether or not current flows through said electric heater.

16. In a coffee maker, a pot, an electric heater for heating said pot to a relatively high temperature to perform the coffee making operation and to subsequently maintain the coffee in said pot at a lower temperature for serving, a thermostat arranged to follow the temperature of said pot, control means responsive to deflection of said thermostat at plural temperature ranges, in the first range to shut off said heater when said pot reaches a predetermined high temperature during the brewing portion of the coffee making operation and in the second range recurrently to turn on and off the heater to maintain the coffee at a substantially uniform serving temperature lower than said brewing temperature, said control means comprising an auxiliary heater disposed in heat transfer relationship with said thermostat for causing said thermostat to operate in said second range.

17. A coffee maker comprising a liquid heating vessel, a main heating element associated with said vessel for heating said vessel and the liquid contained therein during a coffee making operation, a main switch for controlling the flow of current through said heating element comprising a pair of normally closed contacts, a bimetallic element responsive to the temperature of said vessel and adapted upon sufficient heating thereof to cause separation of said contacts, an auxiliary heating element disposed in direct heat transfer relationship with said bimetallic element, an auxiliary switch comprising a pair of contacts for controlling the energization of said auxiliary heating element, means responsive to a predetermined deflection of said bimetallic element in response to heating of said vessel for operating said auxiliary switch effectively to energize said auxiliary heating element, and means responsive to a slightly greater heating of said bimetallic element after said predetermined deflection for operating the other of said switches.

18. A coffee maker comprising a liquid heating vessel, a main heating element associated with said vessel for heating said vessel and the liquid contained therein during a coffee making operation, a first switch for controlling the flow of current through said heating element comprising a pair of normally closed contacts, a bimetallic element responsive to the temperature of said vessel and adapted upon sufficient heating thereof to cause separation of said contacts, an auxiliary heating element disposed in direct heat transfer relationship with said bimetallic element, a second switch comprising a pair of contacts for controlling the energization of said auxiliary heating element, means responsive to a predetermined deflection of said bimetallic element in response to heating of said vessel for operating one of said switches effectively to energize said auxiliary heating element, and means responsive to a slightly greater heating of said bimetallic element after said predetermined deflection for operating the other of said switches effectively to deenergize said main heating element.

19. In an automatic coffee maker, a lower water or brewed coffee heating vessel with an upper infusion vessel to contain ground coffee mounted thereon, and means for delivering heated water from the lower vessel to the upper vessel where brewing occurs and for returning the heated liquid brewed coffee from the upper vessel to the lower vessel, heating means for supplying at least three different temperatures, a thermally actuated multi-contact switch means, the said switch means and the heating means being in an electrical circuit and associated with the lower vessel, the switch means being disposed in heat transfer relationship with the lower vessel and the heating means, the switch means serving to automatically control the heating means so that at least three different temperatures are supplied to the vessel, initially water in the lower vessel is heated by the heating means to a predetermined high temperature for a predetermined length of time while only one set of contacts of the switch means is closed, such high temperature heating of the lower vessel and the water therein resulting in conditions within the same which cause delivery of the highly heated water in the lower vessel through the delivery means to the upper vessel where infusion is effected, whereupon due to heat from the vessel another set of contacts of the switch means is closed while the first mentioned set of contacts is also closed resulting in a still higher predetermined temperature which is maintained for a predetermined length of time while the liquid is in the upper vessel and an infusion of the coffee therein is effected, and upon thermal opening of the first mentioned contacts due to heat from the heating means a lower temperature of heat is attained thus allowing the brewed liquid coffee in the upper vessel to flow through the said delivering means into the lower vessel, and indefinitely maintaining that lower temperature for the brewed coffee in the lower vessel to keep it potable.

20. In a coffee maker, a lower vessel adapted to contain water or brewed coffee with an upper infusion vessel adapted to contain ground coffee mounted thereon, and means for delivering heated water from the lower vessel to the upper vessel where brewing occurs and for returning the heated liquid brewed coffee from the upper vessel to the lower vessel, heating means for supplying at least three different temperatures, a thermally actuated multi-contact switch means, the switch means and the heating means being in an electrical circuit and associated with the lower vessel, the switch means being disposed in heat transfer relationship with the lower vessel and the heating means, the switch means serving to automatically control the heating means so that at least three different temperatures are supplied to the vessel, initially the lower vessel is heated by the heating means to a predetermined high temperature for a predetermined length of time while only one set of contacts of the switch means is closed, such high temperature heating of the lower vessel resulting in conditions within the same which would cause delivery of the water in the lower vessel through the delivery means to the upper vessel where infusion would be effected, whereupon due to heat from the vessel another set of contacts of the switch means is closed while the first mentioned set of contacts is also closed resulting in a still higher predetermined temperature which is maintained for a predetermined length of time while infusion would be effected in the upper vessel, and upon thermal opening of the first mentioned contacts due to heat from the heating means, a lower temperature is attained which would allow brewed liquid coffee in the upper vessel to flow through the delivery means to the lower vessel and would indefinitely maintain brewed coffee in the lower vessel at a lower temperature.

21. In an automatic beverage brewer, a high heat element, a low heat element, and a thermal switch responsive to the heat from both said elements and including a bimetallic strip, a first pair of contacts in series with said high heat element and adapted to be normally engaged when the temperature of said strip is below a first predetermined temperature and disengaged when the temperature of said strip is above said first predetermined temperature, and a second pair of contacts in series with said low heat element and adapted to be normally disengaged when the temperature of said strip is below a second predetermined temperature and engaged when the temperature of said strip is above said second predetermined temperature, said low heat element having sufficient heating capacity when energized to prevent the temperature of said strip from dropping below the higher of said first and second predetermined temperatures when said high heat element is deenergized, whereby the thermal switch is maintained uninterruptedly in circuit closing positions and the high heat element is maintained deenergized and the low heat element is maintained energized until the current is cut off from its source for a definite period of time.

22. In an automatic beverage brewer, a high heat element, a low heat element, and a thermal switch responsive to the heat from both said elements and including a bimetallic strip, first and second contacts in series with said high heat element and normally engaged when the temperature of said strip is below a predetermined temperature, and a third contact adapted to be in engagement with said first contact when the temperature of said strip exceeds a given temperature, said first and third contacts being in series with said low heat element, said strip being responsive to said low heat element and the latter having sufficient heating capacity to elevate and maintain the temperature of the strip above said predetermined temperature and said given temperature for maintaining said first and third contacts engaged and said first and second contacts disengaged when the temperature of said strip is above said predetermined temperature and said given temperature, whereby the thermal switch is maintained uninterruptedly in circuit closing positions and the high heat element is maintained deenergized and the low heat element is maintained energized until the current is cut off from its source for a definite period of time.

23. A thermal switch for controlling the energization of a high heat element and a low heat element and operable from a source of electricity in dependence upon the temperature in the vicinity of said high and low heat elements, said thermal switch including a bimetallic member, a first pair of contacts adapted to be in series with said high heat element, said first pair of contacts being closed when said member is at ambient temperature and being arranged to open when said member is at a first predetermined temperature exceeding the ambient temperature, and a second pair of contacts adapted to be in series with said low heat element and normally open when said bimetallic member is at ambient temperature, said second pair of contacts being arranged to close when said bimetallic member is at a second predetermined temperature intermediate the ambient temperature and the first predetermined temperature, said bimetallic strip being maintained above said first predetermined temperature when the low heat element is energized and the high heat element is deenergized.

IVAR JEPSON.

References Cited in the file of this patent

UNITED STATES PATENTS

| Number | Name | Date |
|---|---|---|
| 2,025,302 | Olds | Dec. 24, 1935 |
| 2,179,936 | Keene | Nov. 14, 1939 |
| 2,212,100 | Keaton | Aug. 10, 1940 |
| 2,287,583 | Weeks | June 23, 1942 |